United States Patent Office 2,873,261
Patented Feb. 10, 1959

2,873,261

HAMMERED METAL FINISH COMPOSITIONS AND METHOD OF MAKING THE SAME

Burton E. Lederman, Dayton, Ohio, assignor to Commonwealth Engineering Corporation, Wilmington, Del., a corporation of Delaware No Drawing. Application July 9, 1956
Serial No. 596,413

2 Claims. (Cl. 260—18)

This invention relates to the art of providing articles with a hammered metal effect finish. More particularly, the invention relates to new compositions which, when sprayed on the base article, form patterns which simulate the hammered metal effect.

The hammered metal effect finish involves the formation on the base of simulated hammer marks which may be relatively large or very fine and close together to provide a metalescent finish, but which, for the most commercially acceptable results, should be substantially uniform in size, whether large or small.

Prior art procedures have involved the use of compositions comprising metallic particles and, as vehicle, a solution of a mixture of two different resins, such as alkyd resins, which are incompatible and separate on evaporation of the solvent from the base.

It is difficult to obtain a uniform finish on the base article when the film-forming component of the vehicle comprises the two incompatible resins.

Usually, the use of those compositions results in a finish in which the pattern is formed by large, uneven simulated hammer marks, or by simulated marks which are of different sizes, some being large, scattered and uneven, others being fine and closely spaced.

Furthermore, use of those compositions containing different resins requires pre-testing of the available resins for the desired incompatibility and separation when the specific solvent used is evaporated. The relative proportions in which the resins have the necessary incompatability in the selected solvent must be determined. The two resins selected for use have to be produced in separate polymerization runs under controlled conditions calculated to produce resins of a determined degree of polymerization, or two batches of the same resin have to be modified with different modifying agents or to different extents with the same modifying agent. All of these special requirements entail close plant supervision and control.

A primary object of this invention is to provide new compositions which, when sprayed on a base, and dried, result in a base having a uniform simulated hammered metal finish.

I have discovered that under specific conditions, cross-linked polymeric polyether-polyhydric alcohols and unsaturated fatty acid esters thereof constitute exceptionally satisfactory film-forming components of vehicles for the metallic particles which give the hammered metal finish. The number of cross-links in the polymeric polyether-polyhydric alcohol or ester must be small, and the cross-links must be uniformly distributed. The final composition comprising the cross-linked polymeric polyether-polyhydric alcohol or ester, the metallic particles, and the solvent must have, at 25% to 50% solids content, a Zahn #3 spray viscosity between 20 and 50 seconds.

I have established, by extensive experiment and comparative tests, that if the compositions comprise the cross-linked polymeric polyether-polyhydric alcohol or ester and meet the viscosity requirements stated, a single spray application results in a uniform finish having a pattern which is superior to that of previous compositions that have been suggested for use in providing base articles with a simulated hammered metal finish.

The polymeric polyether-polyhydric alcohols which are reacted with the cross-linking agent are those that may be prepared by reacting a polyhydric alcohol, and especially a polyhydric phenol, with a polyfunctional alcohol-contributing agent, especially polyhalo alcohols, epihalohydrins or polyoxy compounds.

The polyhydric phenol is, preferably, a mononuclear phenol such as resorcinol, hydroquinone, catechol, phloroglucinol, etc. Or it is a polynuclear phenol such as -bis-phenol-(p,p'-dihydroxy diphenol), -bis-phenol-A-(p, p'-dihydroxy diphenyl dimethyl methane), p,p'-dihydroxy benzophenone, o,p,o',p'-tetrahydroxy diphenyl dimethyl methane, hematoxylin, polyhydric anthracenes, polyhydric naphthalenes, etc.

The polyfunctional alcohol-contributing agent is an epihalohydrin such as epichlorhydrin, epibromhydrin, epihalohydrins of mannitol, sorbitol, erythritol, etc., a polyhalohydrin such as glycerol dichlorhydrin, beta-methyl-glycerol dichlorhydrin, mannitol or sorbitol dichlorhydrin, etc., or a polyepoxide compound such as bis-(2,3-epoxy propyl) ether, butylene dioxide, diepoxides of mannitol, sorbitol, etc.

These reaction products are broadly defined as polymeric polyether-polyhydric alcohols. The more specific definition is polyether derivatives of polyhydric phenols having hydroxyl-containing aliphatic radicals united to the phenolic nuclei through ether linkages.

The presently preferred polymeric polyether-polyhydric alcohol is obtained by reacting -bis-phenol-A- with epichlorhydrin.

The esters of the alcohols which are used in these compositions are obtained by reacting the polymeric polyether-polyhydric alcohol with unsaturated fatty acids. The acids may be used as such or as they occur in drying and semi-drying oils, i. e., the technical grades of the acids can be used.

In a presently preferred embodiment the polymeric polyether-polyhydric phenol is esterified with acids derived from such drying or semi-drying oils as linseed, sunflower, soyabean, hamp and tung oil.

Methods for producing the polymeric polyether-polyhydric alcohols and esters are known.

The esters in which at least 35% of the hydroxyl groups of the alcohol are esterified with the drying or semi-drying oil acids are preferred for the present purposes. It is to be understood that, for purposes of esterification, any epoxy groups present behave as glycol groups in reaction with organic acids, one epoxide group being in general equivalent to two alcoholic hydroxyl groups.

Acidic cross-linking bifunctional reactants are used and are introduced by heating the selected polymeric polyether-polyhydric alcohol (with or without acids being present), and the bifunctional reactant together with agitation until a molten, homogeneous mass is obtained. The critical amount of bifunctional reactant to be used has been found to be, after exhaustive experiment and test, between 1% and 8%, by weight, based on the weight of the polymeric ether-alcohol or ester thereof.

The mixing of the bifunctional cross-linking reactant with heating of the mass permits uniform distribution of the cross-linking reactant through the mass by agitation. This prevents localized gelling due to localized high concentrations of the resin and cross-linking agent, and insures that the cross-links formed are relatively widely but substantially uniformly spaced along the resin chains.

The presently preferred cross-linking agent is phthalic anhydride. Other, preferably dibasic, acids or their anhydrides may be used such as maleic, succinic, fumaric, sebacic, and terephthalic acids or the anhydrides. Dicarboxylic acids containing a total of not more than eight carbon atoms are preferred. If acyclic acids are used, those containing not more than six carbon atoms are preferred.

Rosin acids may be included in the mass.

The solvents used to dilute the cross-linked ester are, preferably, aromatic hydrocarbon solvents including xylol and toluol. Mixtures of the aromatic hydrocarbon solvents can be used. The aromatic hydrocarbons can be diluted with an aliphatic hydrocarbon such as VMP naphtha, or with lacquer-type solvents, e. g. ketones and esters including acetone, methylethyl ketone, methyl isobutyl ketone, Cellosolve, butyl acetate, amyl acetate, etc.

The aliphatic hydrocarbon solvents are preferably used for diluting the cross-linked polymeric polyetherpolyhydric alcohols.

In preparing the compositions, the cross-linking agent is mixed with the polymeric polyether-polyhydric alcohol or ester under heating, and the mass is diluted with the solvent. Enough solvent is added at this stage to give a vehicle which, at 40±2% by weight solids concentration, has an S-V Gardner bubble viscometer range. (See ASTM D-154-47 or Method 427.1 of Federal Specifications TT-P-141.)

Thereafter the metallic particles are dispersed in the vehicle, and additional solvent is mixed in to give a sprayable composition. The total solids content of the final composition including the cross-linked polymeric polyether-polyhydric alcohol or ester and metallic particles is between 25% and 50%.

Minor amounts (2-5%) of such adjuvants as coloring pigments, lead, naphthenates, manganese, cobalt or other drying or baking assistants may be included.

The total amount of solvent used with the given solids content between 25% and 50% is such that the final composition has the required #3 Zahn viscosity between 20 and 50 seconds which I have found is critical to obtaining a uniform commercially acceptable hammered metal finish by a single spray application of these compositions to a base.

The hammered metal finish is a very special one, involving problems of pattern formation which are not met in ordinary coating of a base with a protective or decorative covering coat, or in the use of ordinary coating compositions whether containing metallic particles or not. The uniformity and acceptability of the pattern giving the hammered metal effect is influenced by a combination of factors. Two of the paramount influences are the nature of the resinous film-forming component of the vehicle for the metallic particles and the spray-viscosity of the composition.

The use of the cross-linking reactant in the controlled, critical amounts influences the molecular size and solubility of the polymeric polyether-polyhydric alcohols, or of the esters, so that at 25-50% solids content the viscosity of the compositions can be adjusted to the required value for satisfactory sprayability and, when the compositions are sprayed on the base, under pressure and using an ordinary type spray gun, the composition leaves the gun in the form of relatively large droplets which do not coalesce until they are deposited on the base. The coalescing of the droplets on the surface sets up flow patterns in the film which cause migration and uniformly uneven distribution of the metallic particles to an extent and for a time determined by the rate of evaporation of the solvent from the freshly-formed film, giving, when the film is dried and set, the appearance of hammered metal.

The following examples, in which the parts are given by weight unless otherwise specified, illustrate specific embodiments of the invention.

*Example I*

One hundred parts of a polymeric condensate of bis-phenol-A- and epichlorhydrin (identical with the product marketed by Shell Chemical Corporation under the trade name of "Epon 1004"), 70 parts of soyabean fatty oil acids, and 20 parts of rosin were heated to 480° F. About 7.5 parts of phthalic anhydride were added to the molten mass at that temperature. The mass was held at 480° F. for one hour and then cooled to 350° F. 197 parts of xylol and one hundred parts of VMP naphtha were added, in that order, to obtain a vehicle containing a resinous complex comprising the polyether-polyphenol ester containing phthalyl radicals forming cross-links between the polymeric ester chains.

The vehicle was pigmented by adding 5 parts of medium chrome green to 400 parts of the vehicle and working the mixture in a ball-mill for twenty-four hours.

Using the pigmented paste as a base, a coating composition suitable for spray-application to produce a hammered finish was prepared, the following ingredients being added to 332 parts of the pigmented paste.

| | Parts |
|---|---|
| Guaiacol | 1.3 |
| Lead naphthenate (24% Pb) | 0.8 |
| Manganese naphthenate (6% Mn) | 0.5 |
| Cobalt naphthenate (6% Co) | 0.5 |
| Xylol | 80.0 |
| Deleafed aluminum | 8.0 |

Reduced to a total solids content of 37%, the composition had a Zahn #3 spray viscosity of 40 seconds.

The composition was applied to unprimed steel panels by spraying at approximately 30-50 pounds of air pressure per square inch, using a Binks regular type spray gun, and formed on the panels, after air drying and baking, a hard continuous film having a hammered metal finish.

*Example II*

Example I was repeated except that the vehicle for the metallic particles was prepared as follows—100 parts of the polymeric condensate of bis-phenol and epichlorhydrin known commercially as "Epon 1004," 20 parts of rosin, and 76 parts of phthalic anhydride were added to the molten mass at that temperature. The mass was held at 480° F. for one to three hours and then cooled to 350° F.; 157.5 parts of xylol and 157.5 parts of VMP naphtha were then added, and the following ingredients mixed in.

Using the pigmented paste as a base, a coating composition suitable for spray application to produce a hammered finish was prepared, the following ingredients being added to 332 parts of the pigmented paste.

| | Parts |
|---|---|
| Guaiacol | 1.3 |
| Lead naphthenate (24% Pb) | 0.8 |
| Manganese naphthenate (6% Mn) | 0.5 |
| Cobalt naphthenate (6% Co) | 0.5 |
| Xylol | 80.0 |
| Deleafed aluminum | 8.0 |

Reduced to a total solids content of 37%, the composition had a Zahn #3 spray viscosity of 40±5 seconds.

The composition was applied to unprimed steel panels by spraying at approximately 30-50 pounds air pressure per square inch, using a Binks regular type spray gun, and formed on the panels, after air drying and baking, a hard continuous film having a hammered metal finish.

*Example III*

About 100 parts of "Epon 1004" and 20 parts of rosin were heated to 400° F. Ten parts of phthalic anhydride were added to the molten mass with stirring. The mass was held at 400° F. for 1-3 hours, then cooled to 320° F.

One hundred twenty parts of xylol and 180 parts of VMP naphtha were added.

The vehicle was pigmented by mixing with 200 parts of chrome yellow in a ball-mill for about 15 hours to obtain a pigmented paste.

To 300 parts of the paste were added:

| | Parts |
|---|---|
| Guaiacol | 1.3 |
| Lead naphthenate (24% Pb) | 0.8 |
| Manganese naphthenate (6% Mn) | 0.5 |
| Cobalt naphthenate (6% Co) | 0.5 |
| Xylol | 90.0 |
| Zinc dust | 10.0 |

Reduced to a total solids content of 35%, the composition had a Zahn #3 spray viscosity of 30 seconds.

Applied to unprimed steel panels by spraying at 30-40 pounds air pressure/square inch, using a Binks regular type spray gun, the composition, after air drying and baking, resulted in a hard, continuous film having a hammered metal appearance.

*Example IV*

Example I was repeated except that the vehicle for the metallic particles was prepared as follows—100 parts of "Epon 1004," 20 parts of rosin, and 76 parts of soyabean fatty acids were heated to 480° F. Fourteen parts of phthalic anhydride were added to the molten mass, which was held at 480° F. for 1-3 hours and then cooled to 400° F.; 105 parts of xylol and 165 parts of VMP naphtha then being added.

The composition was made up for spraying as in Example I, the following ingredients being added to 332 parts of the pigmented paste.

| | Parts |
|---|---|
| Guaiacol | 1.3 |
| Lead naphthenate (24% Pb) | 0.8 |
| Manganese naphthenate (6% Mn) | 0.5 |
| Cobalt naphthenate (6% Co) | 0.5 |
| Xylol | 80.0 |
| Deleafed aluminum bronze pigment | 8.0 |

Reduced to a total solids content of 37%, the composition had a Zahn #3 spray viscosity of 40 seconds.

The composition was applied to unprimed steel panels by spraying at approximately 30-50 pounds air pressure per square inch, using a Binks regular type spray gun, and formed on the panels, after air drying and baking, a hard continuous film having a hammered metal finish.

*Example V*

Example I was repeated, with the difference that the vehicle was prepared by heating 100 parts of "Epon 1004," 25 parts of rosin, and 85 parts of soyabean fatty acids to 480° F., adding 10 parts of phthalic anhydride to the molten mass, holding the mass at 480° F. for 1-3 hours, cooling to 400° F. and then mixing the mass with 130 parts of xylol and 200 parts of VMP naphtha. The composition was made up for spraying as in Example I.

An outstanding advantage of these new compositions is their versatility. By choice of the specific polymeric polyether-polyhydric alcohol or ester, cross-linking bifunctional reactant and solvent, the finish obtained can be controlled to have a predetermined pattern formed by uniformly small, medium or large simulated hammer marks.

Since the selections indicated can be made without departing from the spirit and scope of the invention, it is to be understood that the same is not to be limited except as defined in the appended claims.

What is claimed is:

1. A sprayable coating composition adapted for application and drying to produce a simulated hammered metal finish on a base by a single spray application thereof to the base and drying thereof on the base, and consisting essentially of a pigmented paste having finely divided metallic particles suspended therein and a resin obtained by heat reacting about 100 parts by weight of a resinous, film-forming cross-linking polymeric condensation product of p,p'-dihydroxy diphenyl dimethyl methane and epichlorhydrin with 70 parts by weight of soyabean oil fatty acids and 20 parts by weight of rosin, then introducing about 7.5 parts by weight of phthalic anhydride into the molten resinous mass, and incorporating a metallic drier therein consisting of a mixture of lead naphthenate, manganese naphthenate, cobalt naphthenate, and adding organic solvent thinner thereto to produce a sprayable composition, the total solids content of said composition being between 25% and 50% weight and a Zahn #3 spary viscosity of 20 to 50 seconds.

2. A coating composition as set forth in claim 1, wherein the drier comprises aluminum metal flake particles, and the solvent is xylol.

References Cited in the file of this patent

UNITED STATES PATENTS

| 2,500,765 | Montague | Mar. 14, 1950 |
| 2,504,518 | Greenlee | Apr. 18, 1950 |

OTHER REFERENCES

Burrel: Organic Finishing, vol. 16, No. 12, pages 15-20 (December 1955). (Copy in Scientific Library.)

Technical Staff of Shell Chem. Corp., Paint, Oil and Chem. Review, pages 15-18, 48-49 (November 9, 1950). (Copy in Scientific Library.)